(12) United States Patent
Kolesnik et al.

(10) Patent No.: US 12,368,784 B2
(45) Date of Patent: *Jul. 22, 2025

(54) NETWORK BEACON FOR HYPERVISOR INSTALLATIONS

(71) Applicant: Red Hat Israel, Ltd., Raanana (IL)

(72) Inventors: Michael Kolesnik, Netanya (IL); Mordechay Asayag, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,101

(22) Filed: Feb. 5, 2024

(65) Prior Publication Data

US 2024/0179217 A1 May 30, 2024

Related U.S. Application Data

(60) Continuation of application No. 18/111,354, filed on Feb. 17, 2023, now Pat. No. 11,924,293, which is a division of application No. 16/807,143, filed on Mar. 2, 2020, now Pat. No. 11,588,906, which is a division of application No. 15/604,559, filed on May 24, 2017, now Pat. No. 10,582,010.

(51) Int. Cl.
*H04L 67/00* (2022.01)
*G06F 9/455* (2018.01)
*G06F 9/50* (2006.01)
*H04L 41/08* (2022.01)
*H04L 41/0803* (2022.01)
*H04L 41/0806* (2022.01)

(52) U.S. Cl.
CPC .......... *H04L 67/34* (2013.01); *G06F 9/45558* (2013.01); *G06F 9/5077* (2013.01); *H04L 41/08* (2013.01); *H04L 41/0803* (2013.01); *H04L 41/0806* (2013.01); *H04L 41/0809* (2013.01); *G06F 2009/45595* (2013.01)

(58) Field of Classification Search
None
See application file for complete search history.

(56) References Cited

U.S. PATENT DOCUMENTS 9,450,813 B2 9/2016 Nilakantan et al.
2010/0070970 A1 3/2010 Hu et al.
(Continued)

OTHER PUBLICATIONS

Sonstebo, Dag, "Automating Cloudstack and Hypervisor Installation and Configuration," Forseti Consulting Ltd, ShapeBlue, https://www.slideshare.net/DagSonstebo/automating-cloudstackand-hypervisor-installation-andconfiguration, Feb. 28, 2015, 31 pages.
(Continued)

*Primary Examiner* — Qing Yuan Wu
(74) *Attorney, Agent, or Firm* — Dority & Manning, P.A.

(57) ABSTRACT

A system and method for configuring components added to a network is disclosed. The method includes determining, by a host, that network identifying information of a plurality of networks to which the host is connected is unknown, listening for messages on the plurality of networks to obtain network identifying information for respective networks, receiving a message on a network of the plurality of networks, the message including a network identifier and a set of configuration settings, and configuring a network connection of the host for the network in view of the network identifier and the set of configuration settings from the message.

15 Claims, 8 Drawing Sheets

(56) References Cited

U.S. PATENT DOCUMENTS

| | | |
|---|---|---|
| 2013/0144992 A1 | 6/2013 | Barabash et al. |
| 2013/0250951 A1 | 9/2013 | Koganti et al. |
| 2015/0301847 A1 | 10/2015 | Silva et al. |
| 2015/0324182 A1 | 11/2015 | Barros et al. |
| 2016/0078342 A1 | 3/2016 | Tang et al. |
| 2016/0182293 A1 | 6/2016 | Di Benedetto et al. |
| 2016/0323376 A1 | 11/2016 | Shanley et al. |
| 2017/0003992 A1 | 1/2017 | Farkas et al. |
| 2018/0167271 A1 | 6/2018 | Bower, III et al. |

OTHER PUBLICATIONS

Author Unknown, "Configuring your CloudStack Installation," 4.9.0 Documentation, http://docs.cloudstack.apache.org/projects/cloudstackinstallation/en/4.9/configuration.html, accessed online Feb. 28, 2017, 15 pages.

NETWORK BEACON FOR HYPERVISOR INSTALLATIONS

RELATED APPLICATIONS

This patent application is a continuation of co-pending U.S. patent application Ser. No. 18/111,354, filed on Feb. 17, 2023, entitled "NETWORK BEACON FOR HYPERVISOR INSTALLATIONS," which is a divisional of U.S. patent application Ser. No. 16/807,143, filed Mar. 2, 2020, entitled "NETWORK BEACON FOR HYPERVISOR INSTALLATIONS," now U.S. Pat. No. 11,588,906, which is a divisional of U.S. patent application Ser. No. 15/604,559, filed May 24, 2017, entitled "NETWORK BEACON FOR HYPERVISOR INSTALLATIONS," now U.S. Pat. No. 10,582,010, the disclosures of each of which are incorporated herein by reference in their entireties.

TECHNICAL FIELD

Aspects of the present disclosure are generally related to computing systems, and more particularly to the configuration of host machines in a data center.

BACKGROUND

Data centers may include clusters consisting of multiple hosts (e.g., physical servers) in racks. Hypervisors may be added to each host to create and run virtual machines. Virtual machines emulate computer systems and may be referred to as guest machines. To add a hypervisor to a host, an administrator may perform procedures using software to install specific software applications and apply specific network configurations, security configurations, power management configurations, and the like based on the specification of the host. The hypervisors may be connected to and managed by a virtualization management system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Data centers may include clusters that consist of numerous host systems (e.g., physical servers) included in an enclosure (e.g., rack). A data center may include one or more networks to enable communication between the host machines of the same cluster and from cluster to cluster. A host machine in a cluster may include a hypervisor that is configured by an administrator. For example, an administrator can configure a hypervisor by installing certain software packages and applying specific network configurations, security configurations (e.g., firewalls), power management settings, and the like.

As new host machines are added to the cluster, administrators may plug the new host machine physically into the racks and connect the various cables to provide electricity to and/or enable communication between the host machines of the cluster. The administrator then typically manually installs and configures the hypervisor of the new host machine for the network connections of the cluster. Repeating the process of installing and configuring the hypervisor manually and individually on each new host machine is cumbersome, error-prone, and inefficient.

Aspects of the present disclosure address the above and other deficiencies by facilitating an automatic configuration of network connections on a host machine using another device or host machine in the data center. In particular, according to some aspects of the disclosure, the other device (e.g., a device designated to provide network configuration information or the other host machine in the cluster) can have network connections previously configured by a user (e.g., an administrator) and can broadcast, on a respective network, a message that includes configuration settings for a corresponding network connection. Such a message can be broadcasted periodically or upon detecting that a new hypervisor is being added to the cluster, as described more fully below.

When a new hypervisor is installed on a host machine connected to one or more networks in the data center, the new hypervisor may listen for a message on a respective network to obtain configuration settings for its connection to that network. Upon receipt of the message over the corresponding network connection, the new hypervisor may configure the network connection using the configuration settings included in the message and store the configuration settings in a data store. This process may be repeated for all network connections of the new hypervisor.

Thus, the technology discussed herein may be advantageous because it significantly simplifies and improves the process of configuring network connections of a hypervisor being added to a cluster by making the process less time consuming, more convenient for a user and not susceptible to human errors.

Figure 1:
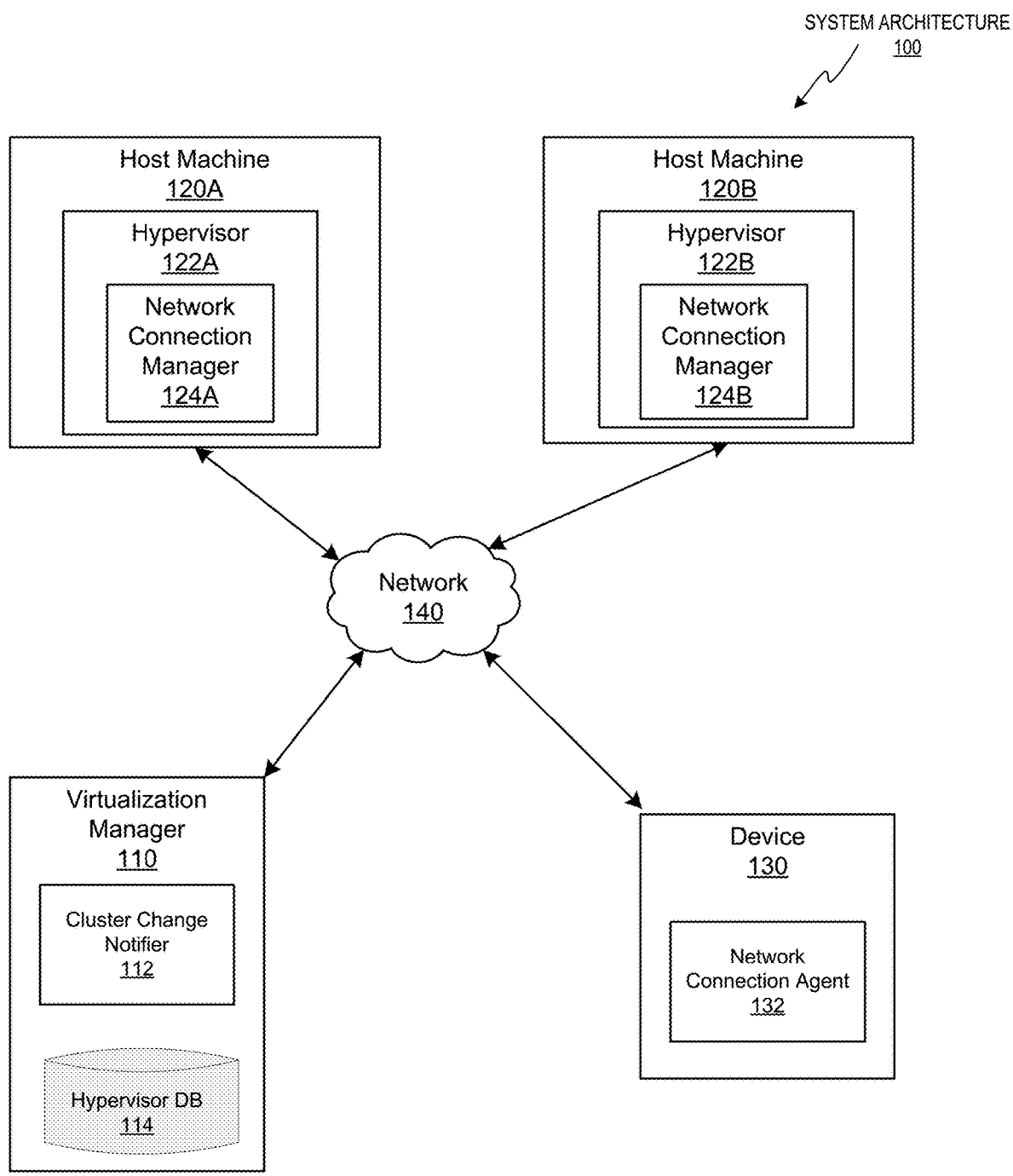
FIG. 1 illustrates an example system architecture in which implementations of the disclosure may operate.

FIG. 1 illustrates an example system architecture 100 in which implementations of the disclosure may operate. The system architecture 100 may include a virtualization manager 110, a plurality of host machines 120A and 120B, and a device 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, networks 140 may include a wired infrastructure (e.g., Ethernet).

Each of the host machines 120A and 120B may comprise one or more processors communicatively coupled to memory devices and input/output (I/O) devices as described in more details below with references to FIG. 8. Each of the host systems 120A and 120B may run a network connection manager 124A and 124B (which may be components of a hypervisor 122A and 122B, respectively) to manage and configure one or more network connections of the host machine. The network connection managers 124A and 124B may generate, transmit and/or receive messages including sets of configuration settings for the one or more network connections of the host machine. Examples of configuration settings include, but are not limited to, network identifiers, network names and network mapping. For example, the message may identify one or more of the network connections as virtual local area networks (VLANs), which may cause a hypervisor to implement a software bridge that all VLAN connections may connect through. In another example, the group of host machines may be a cloud system and the set of configuration settings may cause the hypervisor 122A or 122B to implement a virtual switch. In another implementation, the set of configuration settings may cause the hypervisor to configure its network connections once the hypervisor is installed on the host system. In an illustrative example, hypervisors 122A and 122B may be provided by a Virtual Desktop and Server Management (VDSM) daemon (not shown). The VDSM daemon may include an application programming interface (API) with which the virtualization manager 110 interfaces.

In certain implementations, host systems 120A and 120B may be grouped into one or more logical groups that may be also referred to as a "data center". Each data center may be communicatively coupled, via the network 140, to one or more storage domains storing disk images for machines. In one implementation, host machine 120A may be a host machine that was previously configured for the one or more network connections, and host machine 120B may be a host machine that has been added to the cluster and has not yet been configured for the one or more network connections.

The virtualization manager 110 may be hosted by a computer system (described in more details herein below with references to FIG. 8) and include one or more computer programs executed by the computer system for centralized management of the system architecture 100. In one implementation, the virtualization manager 110 may comprise various interfaces, including administrative interface, reporting interface, and/or application programming interface (API) to communicate with host machines 120A and 120B of system architecture 100, as well as to user portals, directory servers, and various other components, which are omitted from FIG. 1 for clarity.

Virtualization manager 110 may detect changes in the cluster configuration and send a notification. In one example, virtualization manager 110 may include a cluster change notifier 112 and a hypervisor database 114. The cluster change notifier 112 may extract certain information, such as identification information (e.g., hypervisor name, hypervisor IP address, etc.), a set of configuration parameters (e.g., software packages, network settings, security settings, power management settings, etc.), and the like, and store the information in the hypervisor database 114 for each existing host machine, such as host machine 120A. Further, the cluster change notifier 112 may detect that a host machine, such as host machine 120B, has been added to the cluster and send a notification over network 140 to another host machine such as host machine 120A and/or to device 130. The cluster change notifier 112 may also detect changes in components of host machines 120A and/or 120B. For example, the cluster change notifier may detect that a new network interface card (NIC) has been installed on host machines 120A and/or 120B. Although host systems 120A and 120B are shown, it should be understood that any number of host systems may be included in a data center.

In some implementations, instead of (or in addition to) facilitating automatic configuration of network connections of host machines via a network connection manager running on a host machine, aspects of the present disclosure use device 130 coupled host machines in the cluster via a network 140. Device 130 may be a designated device or another host machine that is communicatively coupled to the cluster and may include any suitable computing device, such as a router, smartphone, tablet, laptop, desktop, server, system on a chip, or the like. As such, device 130 may include one or more non-transitory, machine-readable storage media that store computer instructions and one or more processing devices that execute the stored computer instructions. For example, the device 130 may execute a network connection agent 132 that has one or more network connections for one or more networks in the data center. The network connections may be initially configured by a user (e.g., an administrator) with particular configuration settings, and the network connection agent 132 may generate messages including the configuration settings and broadcast the messages on respective networks using corresponding network connections. In one example, the data center includes a single designated device 130 with network connections to all networks in the data center. In another example, each cluster has a single designated device 130 with network connections to all networks used by the cluster. In yet another example, multiple devices 130 are provided, where each of these devices is associated with a particular network in the data center and/or cluster, and has a configured network connection for that network.

Figure 2:
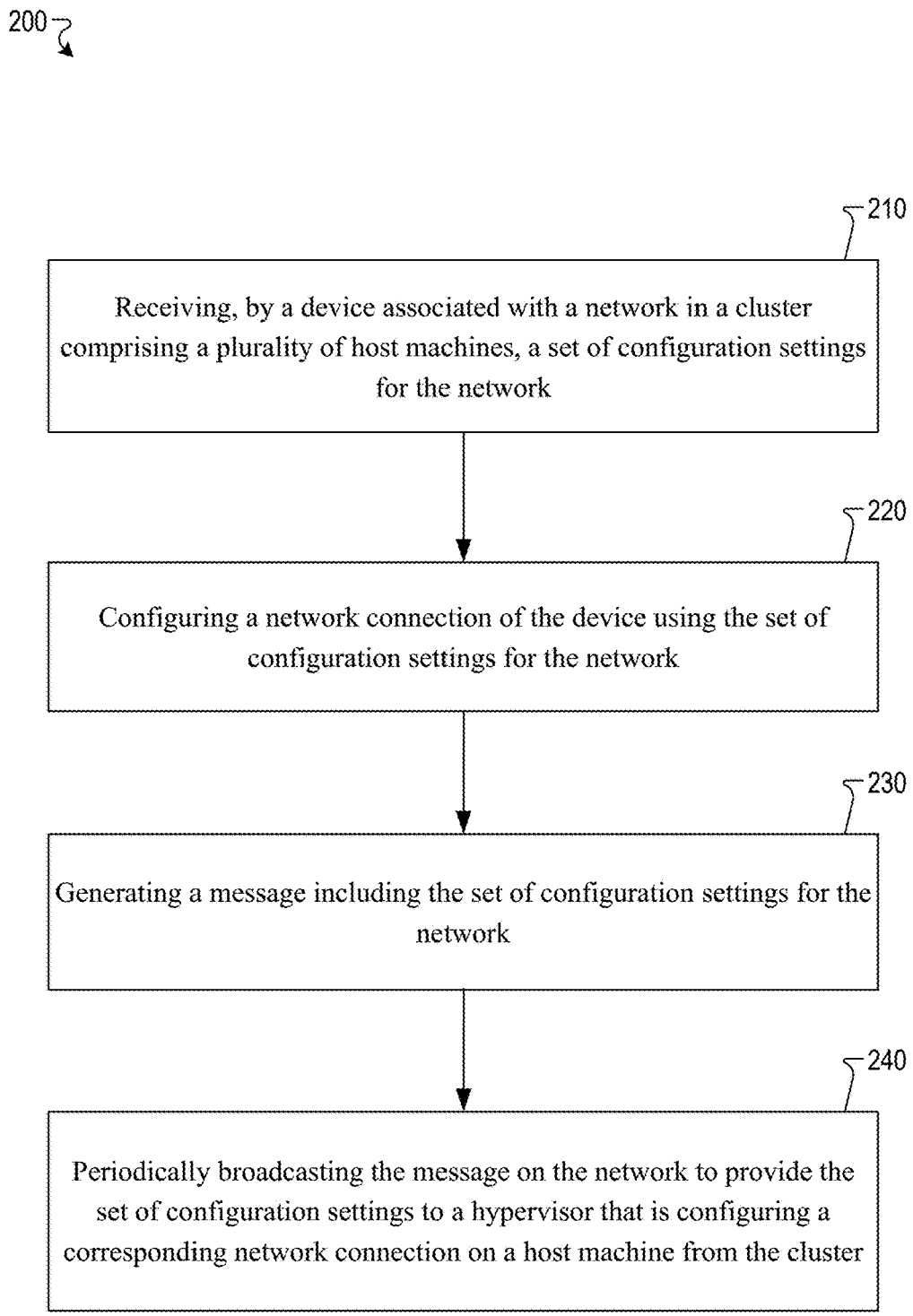
FIG. 2 is a flow diagram of one example of a method for facilitating an automatic configuration of network connections on a host machine via a network, in accordance with one or more aspects of the present disclosure.

FIG. 2 is a flow diagram of one example of a method 200 for facilitating an automatic configuration of network connections on a host machine via a network, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the network connection agent 132 executed by one or more processing devices of device 130. Alternatively, method 200 may be performed by the network connection manager 124A executed by one or more processing devices of host system 120A.

Method 200 may begin at block 210. At block 210, a device (e.g., host machine 120A or designated device 130) associated with a network may receive a set of configuration settings for the network. In one implementation, an administrator may input the set of configuration settings on the device via a command-line interface or a graphical user interface. For example, the set of configuration settings may include a network identifier, a network name, network mapping, or any combination thereof, for the network. In some implementations, the device may receive multiple sets of configuration settings for multiple network connections. At block 220, the device may use the received set of configuration settings to configure the network connection(s). The set of configuration settings may be stored in a data store of device 130.

At block 230, the device may generate a message that includes the set of configuration settings received at block 210. At block 240, the device may periodically broadcast the message on the respective network to provide the set of configuration settings to a hypervisor that is configuring a corresponding network connection on a host machine. In one implementation, the device may periodically broadcast the message on the network in response to a command. For example, an administrator may issue a command for the device to periodically broadcast the message on the network. In another implementation, the device may periodically broadcast the message on the network according to a timing schedule that specifies an amount of time between broadcasts of the message on the network. For example, the timing schedule may specify that the amount of time between broadcasts of the message is 10 seconds. Thus, when 10 seconds has elapsed since the most recent broadcast of the message, the message may be broadcast on the network. In a further implementation, the device may periodically broadcast the message on the network in response to receiving a notification from the virtualization manager (e.g., the cluster change notifier 112) indicating a change in the configuration of the cluster. For example, the device 130 may receive a notification from cluster change notifier 112 indicating that a new host machine or a new hypervisor is being added to the cluster. In another example, the device 130 may receive a notification from cluster change notifier 112 indicating that a new network interface card (NIC) has been installed on a host machine in the cluster. In response to receiving the notification, the device may begin to periodically broadcast the message on the respective network. As discussed above, the device may be connected to multiple networks, and may broadcast a corresponding message on each of those networks. In one implementation, the message may be periodically broadcast using an address resolution protocol (ARP) that maps an internet protocol (IP) address to a physical machine address. Using the ARP may allow the message to be broadcast on a network without having an IP address.

Figure 3:
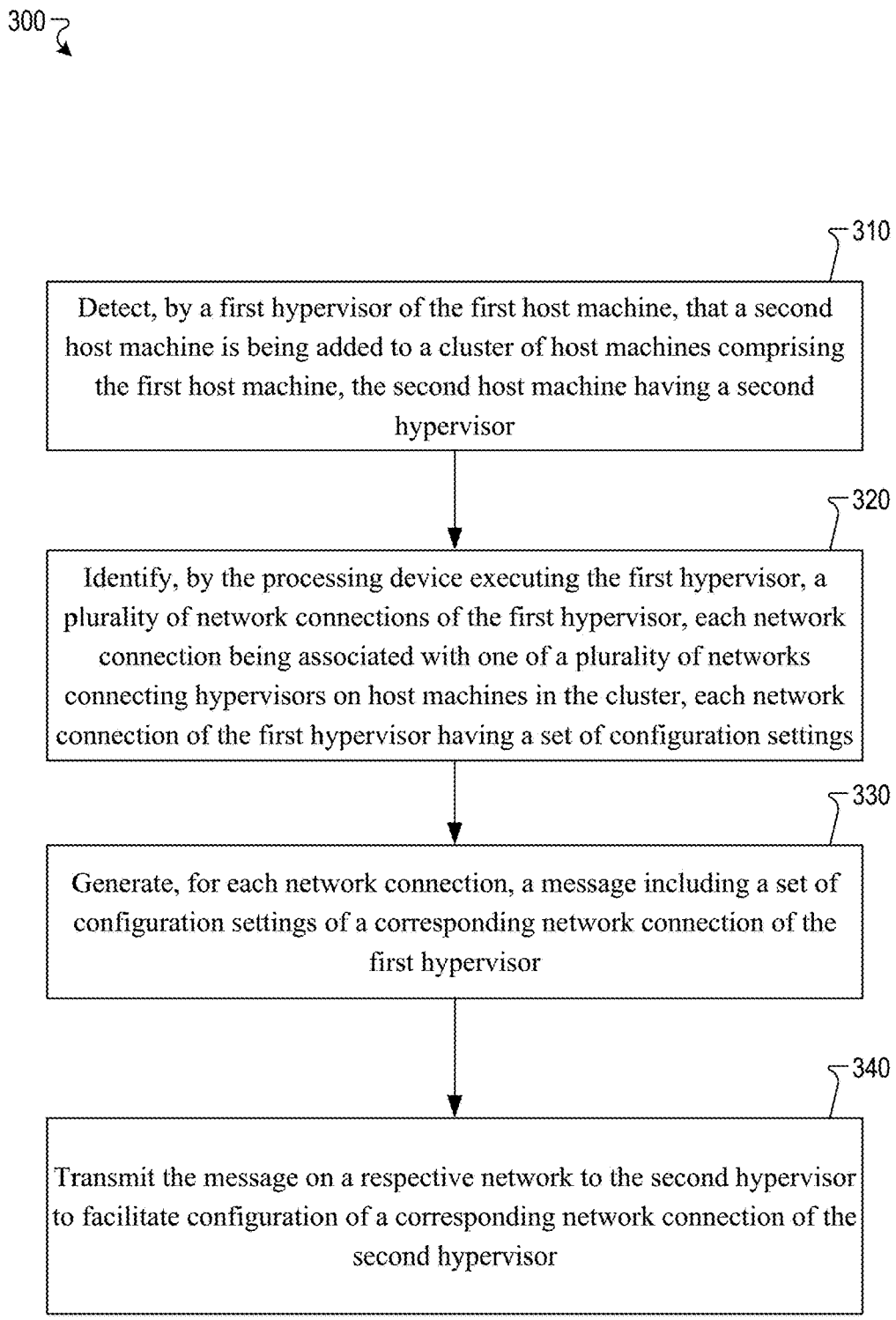
FIG. 3 is a flow diagram of another example of a method for facilitating an automatic configuration of network connections on a host machine via a network, in accordance with one or more aspects of the present disclosure.

FIG. 3 is a flow diagram of another example of a method 300 for facilitating an automatic configuration of network connections on a host machine via a network, in accordance with one or more aspects of the present disclosure. Method 300 and each of its individual functions, routines, subroutines, or operations may be performed by one or more processing devices of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

In one implementation, method 300 may be performed by the network connection manager 124A executed by one or more processing devices of host machine 120A.

Method 300 may begin at block 310. At block 310, hypervisor 124A of host machine 120A may detect that a second host machine having a second hypervisor (e.g., host machine 120B and hypervisor 122B) is being added to the cluster of host machines. The cluster of host machines may include host machines 124A and 124B. In one implementation, hypervisor 124A may detect the second most machine is being added to the cluster by receiving a notification from the cluster change notifier 112 over network 140. The notification may indicate that a second host machine (e.g., host machine 120B) has been added to the cluster. At block 320, hypervisor 124A may identify one or more network connections of hypervisor 124A. Each network connection may be associated with a network that connects hypervisors on host machines in the cluster and each network connection may have a set of configuration settings. For example, the set of configuration settings may include a network identifier, a network name, network mapping or any combination thereof. In one implementation, the hypervisor 124A may identify the network connections and corresponding sets of configuration settings by searching and identifying the network connections and their corresponding sets of configuration settings in a data store of host machine 120A. In some implementations, the cluster may include multiple networks connecting hypervisors on host machines in the cluster. In further implementations, a subset of the multiple networks connecting hypervisors on host machines in the cluster may be virtual networks, such as VLANs.

At block 330, hypervisor 122A may generate a message for each identified network connection at block 320 that includes the set of configuration settings associated with each identified network connection. In one implementation, the hypervisor 122A may receive an input that selects a subset of the set of configuration settings for each of the identified networks and the selected subset of the set of configuration settings will be included in the generated message.

At block 340, hypervisor 122A may transmit the message on a respective network to the second hypervisor (e.g., hypervisor 122B) to facilitate configuration of a corresponding network connection of the second hypervisor. In one implementation, hypervisor 122A may periodically broadcast the message on the respective network in response to a command to transmit the message. For example, an administrator may input a command to hypervisor 122A to periodically broadcast the message on the respective network. In another implementation, hypervisor 122A may transmit the message on the respective network according to a timing schedule that specifies an amount of time between broadcasts of the message on the respective network. For example, the timing schedule may specify that the amount of time between broadcasts of the message is 10 seconds. Thus, when 10 seconds has elapsed since the most recent transmission of the message on the respective network, the message may be transmitted on the respective network. In a further implementation, hypervisor 122A may determine how frequently changes are made to the respective network and transmit the message in view of the determined frequency. For example, if the configuration of the respective network is changed more frequently relative to other networks of the cluster, then the message may be transmitted more often. Conversely, if the configuration of the respective network is changed less frequently relative to other networks of the cluster, then the message may be transmitted less often. In one implementation, the message may be transmitted using an ARP that maps an IP address to a physical machine address.

Figure 4:
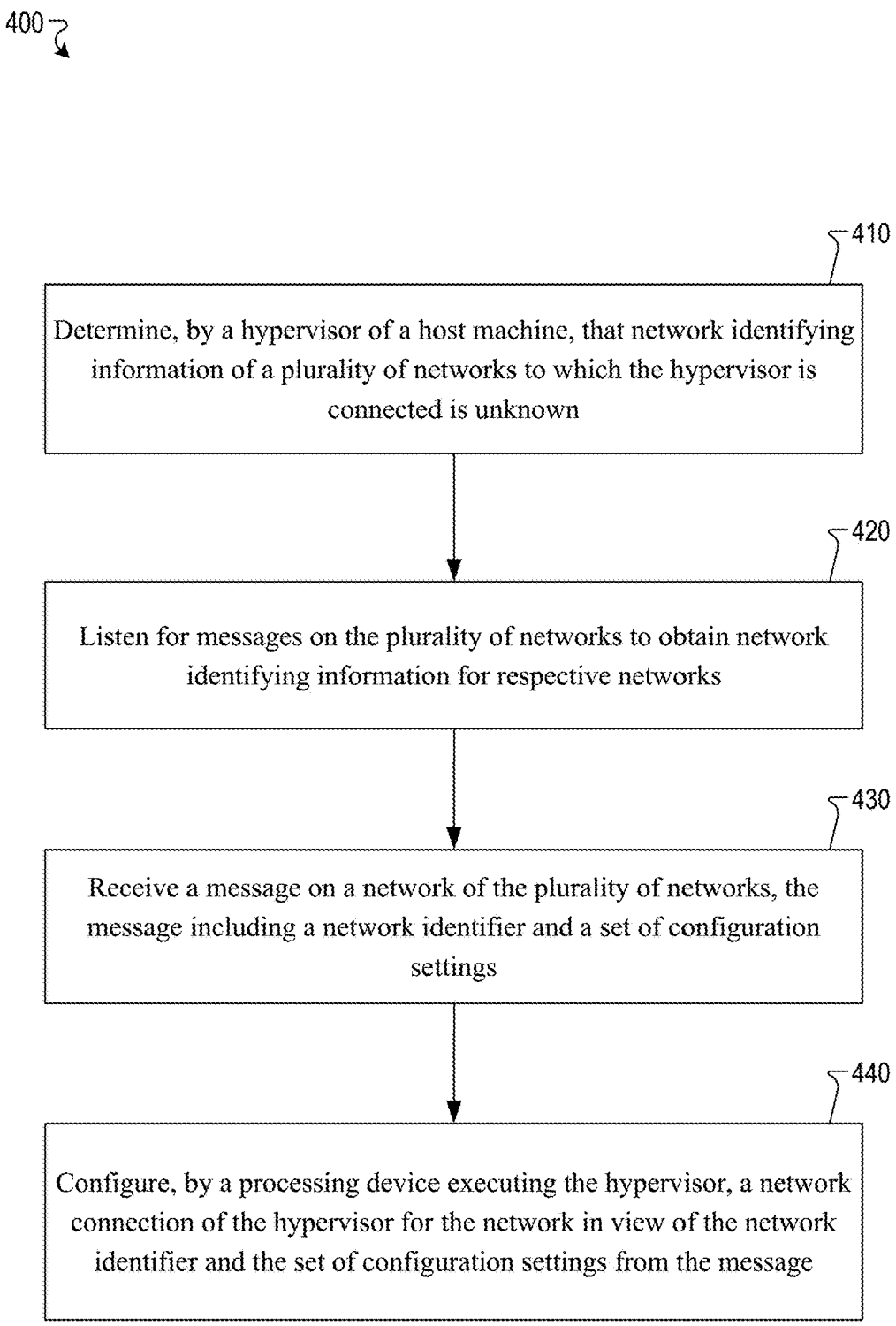
FIG. 4 is a flow diagram of one example of a method for automatically configuring network connections on a host machine, in accordance with one or more aspects of the present disclosure.

FIG. 4 is a flow diagram of one example of a method 400 for automatically configuring network connections on a host machine, in accordance with one or more aspects of the present disclosure. Method 400 and each of its individual functions, routines, subroutines, or operations may be performed by one or more processing devices of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

In one implementation, method 400 may be performed by the network connection manager 124B executed by one or more processing devices of host machine 120B.

Method 400 may begin at block 410. At block 410, hypervisor 122B of host machine 120B may determine that network identifying information of one or more networks that the hypervisor 122B is connected to is unknown. For example, when hypervisor 122B is first connected to the networks of a cluster, it may search a data store of host machine 120B for network identifying information associated with the connected networks of the cluster. If the network identifying information is not found in the data store, then the hypervisor 122B may determine that the network identifying information of the connected networks of the cluster is unknown. Alternatively, the hypervisor 122B may detect that a new NIC has been installed on the host machine and may determine that network identifying information of the network associated with the new NIC is unknown.

At block 420, the hypervisor 122B may listen for messages on the networks in order to obtain network identifying information for the respective networks. In one implementation, the hypervisor 122B may listen for messages in response to receiving a command to begin listening for messages on the networks of the cluster. For example, an administrator may input a command for hypervisor 122B to begin listening for messages over the networks of the cluster. At block 430, hypervisor 122B may receive a message over one of the networks of the cluster. The message may include a network identifier and a set of configuration settings for the network the message is received on. At block 440, hypervisor 122B may configure a network connection of the host machine 120B for the network the message was received over. The network connection may be configured in view of the network identifier and the set of configuration settings that were included in the received message. The hypervisor 122B may store the network identifier and the set of configuration settings in a data store of host machine 120B. In some implementations, hypervisor 122B may receive a second message on the network that includes an updated network identifier and/or an updated set of configuration settings. Hypervisor 122B may re-configure the network connection of the host machine 120B in view of the updated network identifier and/or the updated set of configuration settings from the message. For example, an administrator may update network configuration settings for one or more networks and hypervisor 122B may receive a message including the updated configuration settings. The hypervisor 122B may store the updated configuration settings in a data store of host machine 120B.

Figure 5:
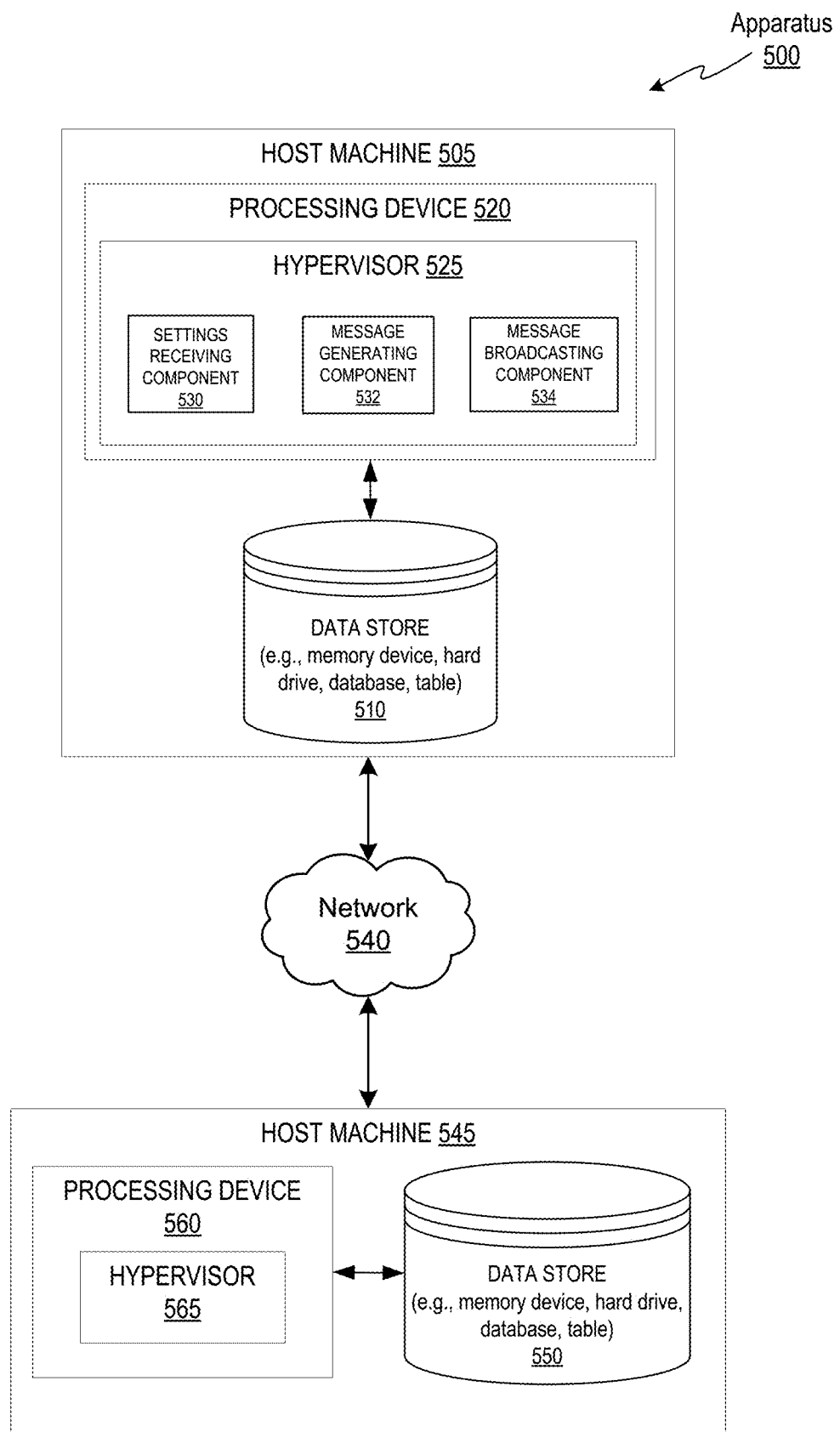
FIG. 5 illustrates an example apparatus in which implementations of the disclosure may operate.

FIG. 5 illustrates an example apparatus 500 in which implementations of the disclosure may operate. The apparatus 500 may be the same or similar to one of the distributed computing system, a network, or other computing devices. Data stores 510 and 550 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data stores 510 and 550 may store information (e.g., policy management information).

The apparatus 500 may include a first host machine 505 having a processing device 520 that executes a first hypervisor 525. The first hypervisor 525 may include a settings receiving component 530, a message generating component 532, and a message broadcasting component 534.

The settings receiving component 530 may receive a set of configuration settings for a network of a cluster that are to be included in a generated message. The message generating component 532 may generate the message that includes the set of configuration settings received by the settings receiving component 530. The message broadcasting component 534 may periodically broadcast the message generated by the message generating component 532 over the network of the cluster to provide the set of configuration settings to a hypervisor that is configuring a corresponding network connection on a host machine from the cluster. The message broadcasting component 534 may also determine when to transmit the message. For example, the message broadcasting component 534 may periodically broadcast the message in response to receiving a command to broadcast the message. In one implementation, the message broadcasting component 534 may broadcast the message according to a timing schedule. In a further implementation, the message broadcasting component 534 may broadcast the message in view of how frequently a network is changed.

The apparatus 500 may include a second host machine 545 having a processing device 560 that executes a second hypervisor 565. The second host machine 545 may be communicatively coupled to the first host machine 505 via one or more networks 540.

Figure 6:
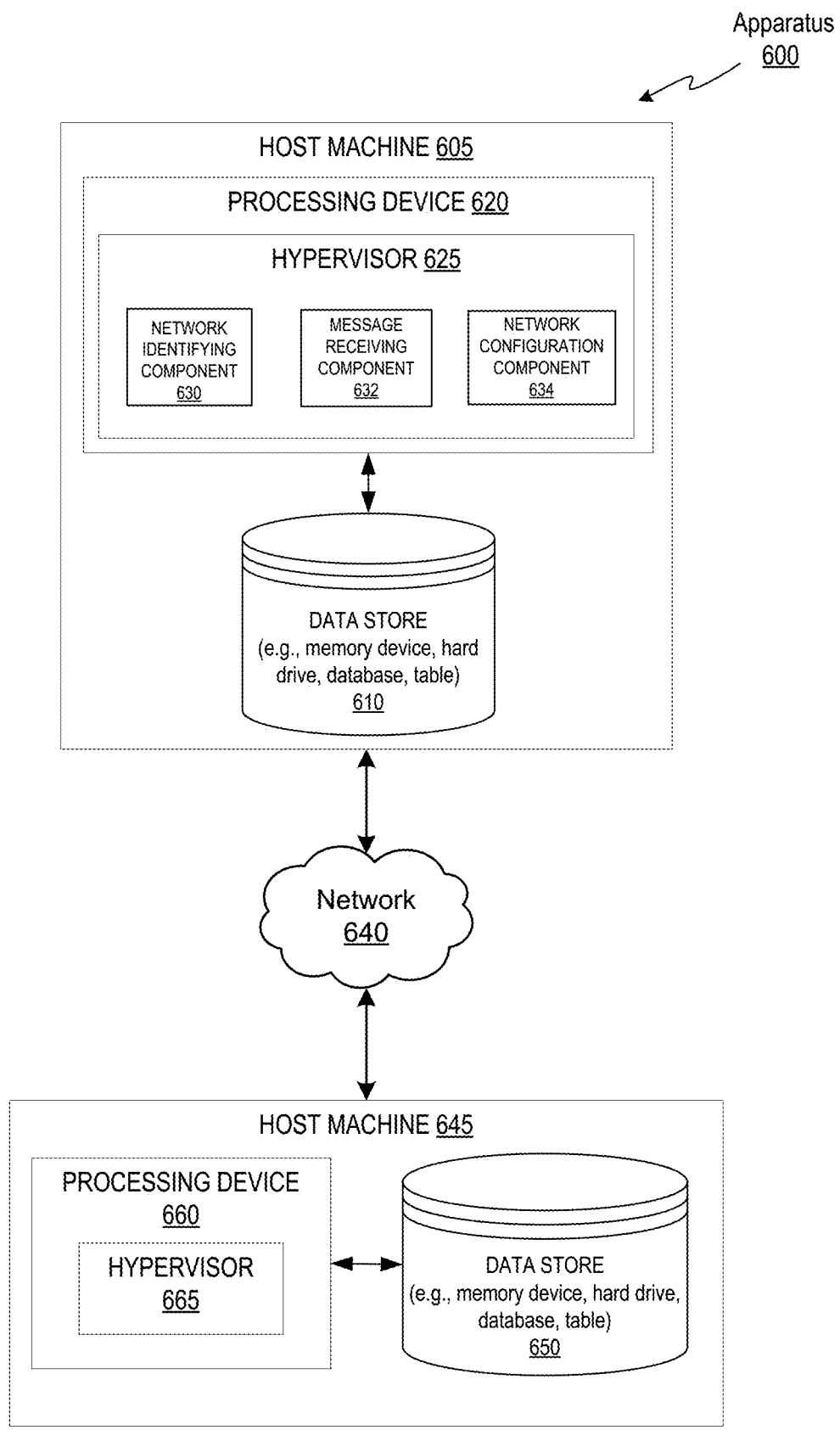
FIG. 6 illustrates another example apparatus in which implementations of the disclosure may operate.

FIG. 6 illustrates another example apparatus 600 in which implementations of the disclosure may operate. The apparatus 600 may be the same or similar to one of the distributed computing system, a network, or other computing devices. Data stores 610 and 650 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data stores 610 and 650 may store information (e.g., policy management information).

The apparatus 600 may include a first host machine 605 having a processing device 620 that executes a first hypervisor 625. The first hypervisor 625 may include a network identifying component 630, a message receiving component 632, and a network configuration component 634.

The network identifying component 630 may determine that network identifying information of one or more networks that a hypervisor is connected to is unknown. The message receiving component 632 may listen and receive a message that includes a network identifier and set of configuration settings for each of the one or more networks. The network configuration component 634 may configure a network connection of the hypervisor for a respective network in view of the network identifier and the set of configuration settings from the message received by the message receiving component 632.

The apparatus 600 may include a second host machine 645 having a processing device 660 that executes a second hypervisor 665. The second host machine 645 may be communicatively coupled to the first host machine 605 via one or more networks 640.

Figure 7:
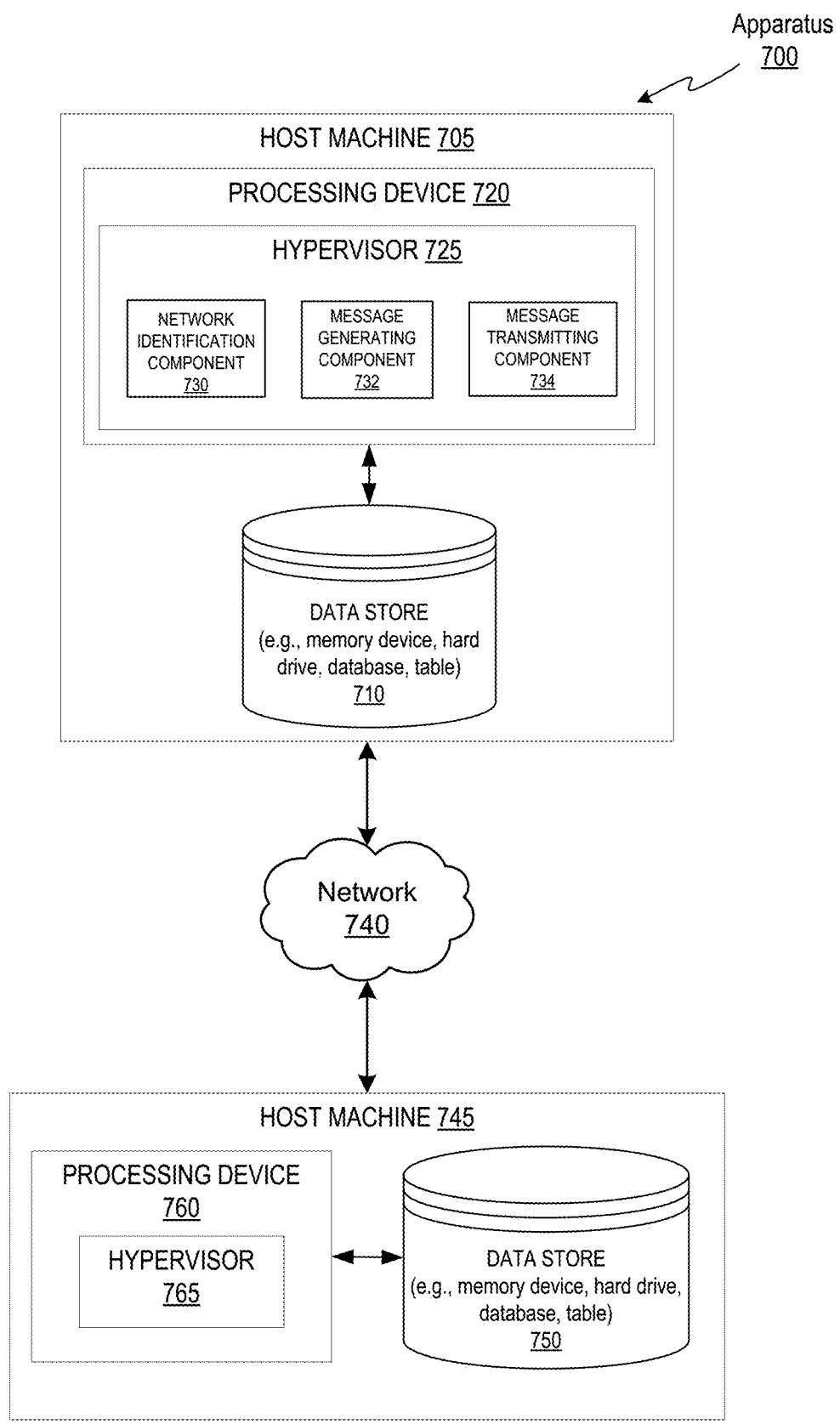
FIG. 7 illustrates yet another example apparatus in which implementations of the disclosure may operate.

FIG. 7 illustrates yet another example apparatus 700 in which implementations of the disclosure may operate. The apparatus 700 may be the same or similar to one of the distributed computing system, a network, or other computing devices. Data stores 710 and 750 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data stores 710 and 750 may store information (e.g., policy management information).

The apparatus 700 may include a first host machine 705 having a processing device 720 that executes a first hypervisor 725. The first hypervisor 725 may include a network identification component 730, a message generating component 732, and a message transmitting component 734.

The network identification component 730 may identify a set of configuration settings for a network of a cluster that are to be included in a generated message. The message generating component 732 may generate the message that includes the set of configuration settings identified by the network identification component 730. The message transmitting component 734 may transmit the message generated by the message generating component 732 over a respective network to a second hypervisor to facilitate configuration of a corresponding network connection of the second hypervisor. The message transmitting component 734 may also determine when to transmit the message. For example, the message transmitting component 734 may transmit the message in response to receiving a command to transmit the message. In one implementation, the message transmitting component 734 may transmit the message according to a timing schedule. In a further implementation, the message transmitting component 734 may transmit the message in view of how frequently a network is changed.

The apparatus 700 may include a second host machine 745 having a processing device 760 that executes a second hypervisor 765. The second host machine 745 may be communicatively coupled to the first host machine 705 via one or more networks 740.

Figure 8:
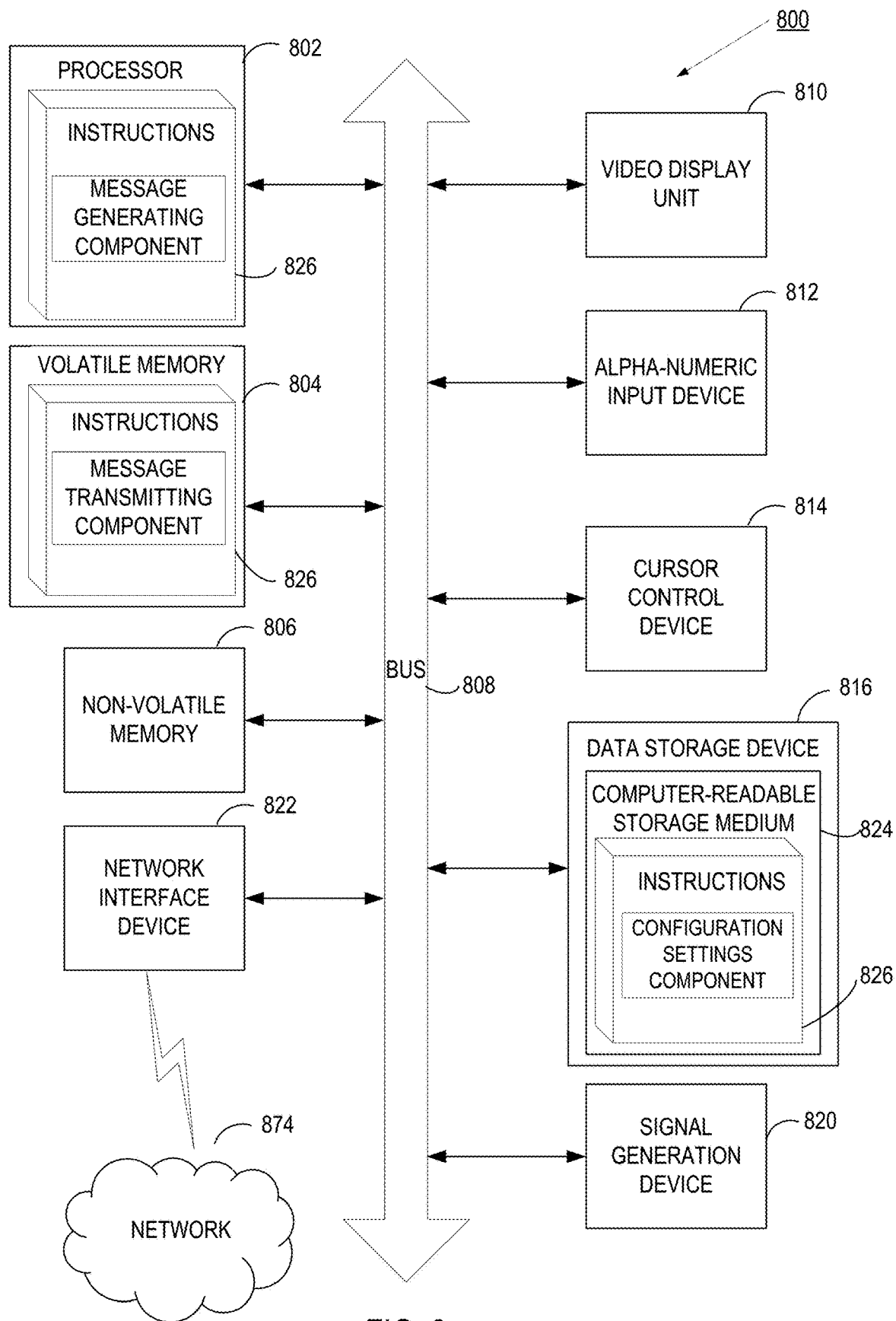
FIG. 8 depicts a block diagram of a computing system operating in accordance with one or more aspects of the present disclosure.

FIG. 8 depicts a block diagram of a computing system operating in accordance with one or more aspects of the present disclosure. In various illustrative examples, computing system 800 may correspond to one or more of the network system, the application, the DNS server, the data centers, the load balancers, the client device, or other computing devices.

In certain implementations, computing system 800 may be connected (e.g., via a network, such as a Local Area Network (LAN), an intranet, an extranet, or the Internet) to other computing systems. Computing system 800 may operate in the capacity of a server or a client computer in a client-server environment, or as a peer computer in a peer-to-peer or distributed network environment. Computing system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computing system 800 may include a processor 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processor 802 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computing system 800 may further include a network interface device 822. Computing system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may be stored instructions 826 encoding any one or more of the methods or functions described herein, including instructions for implementing methods 200, 300 and 400.

Instructions 826 may also reside, completely or partially, within volatile memory 804 and/or within processor 802 during execution thereof by computing system 800, hence, volatile memory 804 and processor 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by program modules or functional circuitry within hardware devices. Further, the methods, components, and features may be implemented in any combination of hardware devices and program components, or only in programs.

Unless specifically stated otherwise, terms such as "loading," "transmitting," "receiving," "overwriting," "initiating," "discovering," "analyzing," or the like, refer to actions and processes performed or implemented by computing systems that manipulate and transform data represented as physical (electronic) quantities within the computing system registers and memories into other data similarly represented as physical quantities within the computing system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computing system selectively programmed by a program stored in the computing system. Such a program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 200, 300 and 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining, by a host, that network identifying information of a first network to which the host is connected is unknown;
   analyzing a plurality of messages received on one or more networks, including the first network;
   identifying a first message of the plurality of messages that includes a network identifier and a set of configuration settings;
   automatically configuring a network connection of the host for the first network in view of the network identifier and the set of configuration settings;
   receiving a second message via the one or more networks that includes an updated set of configuration settings; and
   automatically configuring the network connection of the host for the first network in view of the updated set of configuration settings from the second message.

2. The method of claim 1, further comprising:
   storing the updated set of configuration settings in a data store of the host.

3. The method of claim 1, wherein determining that the network identifying information of the first network to which the host is connected is unknown comprises determining that the network identifying information is not stored in a data store of the host.

4. The method of claim 1, wherein the first message is an address resolution protocol message that maps an internet protocol address to a physical machine address.

5. The method of claim 1, wherein the host comprises a hypervisor, and the network connection is a network connection managed by the hypervisor.

6. A host comprising:
   a memory; and
   a processing device coupled to the memory, wherein the processing device is to:
      determine that network identifying information of a first network to which the host is connected is unknown;
      analyze a plurality of messages received on one or more networks, including the first network;
      identify a first message of the plurality of messages that includes a network identifier and a set of configuration settings;
      automatically configure a network connection of the host for the first network in view of the network identifier and the set of configuration settings;
      receive a second message via the one or more networks that includes an updated set of configuration settings; and
      automatically configure the network connection of the host for the first network in view of the updated set of configuration settings from the second message.

7. The host of claim 6, wherein the processing device is further to:
   store the updated set of configuration settings in a data store of the host.

8. The host of claim 6, wherein to determine that the network identifying information of the first network to which the host is connected is unknown the processing device is further to determine that the network identifying information is not stored in a data store of the host.

9. The host of claim 6, wherein the first message is an address resolution protocol message that maps an internet protocol address to a physical machine address.

10. The host of claim 6, wherein the host comprises a hypervisor, and the network connection is a network connection managed by the hypervisor.

11. A non-transitory computer readable storage medium having instructions that, when executed by a processing device, cause the processing device of a host to:
    determine that network identifying information of a first network to which the host is connected is unknown;

analyze a plurality of messages received on one or more networks, including the first network;

identify a first message of the plurality of messages that includes a network identifier and a set of configuration settings;

automatically configure a network connection of the host for the first network in view of the network identifier and the set of configuration settings;

receive a second message via the one or more networks that includes an updated set of configuration settings; and automatically configure the network connection of the host for the first network in view of the updated set of configuration settings from the second message.

12. The non-transitory computer readable storage medium of claim 11, wherein the instructions further cause the processing device to:

store the updated set of configuration settings in a data store of the host.

13. The non-transitory computer readable storage medium of claim 11, wherein to determine that the network identifying information of the first network to which the host is connected is unknown, the instructions further cause the processing device to determine that the network identifying information is not stored in a data store of the host.

14. The non-transitory computer readable storage medium of claim 11, wherein the first message is an address resolution protocol message that maps an internet protocol address to a physical machine address.

15. The non-transitory computer readable storage medium of claim 11, wherein the host comprises a hypervisor, and the network connection is a network connection managed by the hypervisor.

* * * * *